United States Patent
Jiang et al.

(10) Patent No.: US 9,019,859 B2
(45) Date of Patent: Apr. 28, 2015

(54) METHOD FOR CALIBRATING LISTEN DURATION AND LISTEN INTERVAL AND CONTROL MODULE THEREOF

(71) Applicant: Acer Incorporated, New Taipei (TW)

(72) Inventors: Shu-Yu Jiang, New Taipei (TW);
Yung-Sen Lin, New Taipei (TW);
Ruei-Chuan Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 35 days.

(21) Appl. No.: 13/778,125

(22) Filed: Feb. 27, 2013

(65) Prior Publication Data
US 2014/0169191 A1  Jun. 19, 2014

(30) Foreign Application Priority Data
Dec. 17, 2012 (TW) .............................. 101147889 A

(51) Int. Cl.
| | |
|---|---|
| *H04W 24/02* | (2009.01) |
| *H04W 52/02* | (2009.01) |
| *H04J 3/14* | (2006.01) |
| *H04L 12/26* | (2006.01) |
| *H04W 48/12* | (2009.01) |
| *H04W 84/12* | (2009.01) |
| *H04W 76/04* | (2009.01) |

(52) U.S. Cl.
CPC .............. *H04W 24/02* (2013.01); *H04W 48/12* (2013.01); *H04W 52/0229* (2013.01); *H04W 84/12* (2013.01); *H04W 52/0216* (2013.01); *H04W 76/048* (2013.01)

(58) Field of Classification Search
CPC ......... H04J 3/00; H04W 24/02; H04W 52/02; H04L 12/26
USPC ......................................... 370/252, 332, 311
See application file for complete search history.

(56) References Cited

U.S. PATENT DOCUMENTS

| | | | | |
|---|---|---|---|---|
| 8,223,662 | B2* | 7/2012 | Deshpande et al. ........... | 370/252 |
| 8,233,456 | B1* | 7/2012 | Kopikare et al. .............. | 370/332 |
| 2007/0268856 | A1 | 11/2007 | Wijting et al. | |
| 2010/0157863 | A1 | 6/2010 | Gong et al. | |
| 2010/0226299 | A1* | 9/2010 | Sumida et al. ................. | 370/311 |
| 2013/0094421 | A1* | 4/2013 | Wang et al. .................... | 370/311 |
| 2014/0036746 | A1* | 2/2014 | Mannemala et al. .......... | 370/311 |

FOREIGN PATENT DOCUMENTS

| | | |
|---|---|---|
| CN | 101331439 | 12/2008 |
| EP | 2079192 | 7/2009 |
| TW | 566016 | 12/2003 |
| WO | 2014021888 | 2/2014 |

\* cited by examiner

*Primary Examiner* — Chi H Pham
*Assistant Examiner* — Shailendra Kumar
(74) *Attorney, Agent, or Firm* — Jianq Chyun IP Office

(57) ABSTRACT

A method for calibrating a listen duration and a listen interval and a control module thereof are provided. The method is suitable for being applied in a wireless device and monitoring beacons transmitted by a wireless access point (AP) within a wireless transmission range to calibrate the listen duration and the listen interval. The method includes: calculating an average beacon-receiving time and an RMS beacon-receiving time according to a beacon-receiving interval obtained within a first specific time frame when the listen duration and the listen interval are determined to be calibrated; setting the average beacon-receiving time and the RMS beacon-receiving time as an optimal listen interval and an optimal listen duration, respectively; monitoring beacons in X optimal listen durations according to the optimal listen interval and the optimal listen duration; if at least Y beacons are received, determining the calibration is successful, wherein X and Y are positive integers.

18 Claims, 2 Drawing Sheets

METHOD FOR CALIBRATING LISTEN DURATION AND LISTEN INTERVAL AND CONTROL MODULE THEREOF

CROSS-REFERENCE TO RELATED APPLICATION

This application claims the priority benefit of Taiwan application serial no. 101147889, filed on Dec. 17, 2012. The entirety of the above-mentioned patent application is hereby incorporated by reference herein and made a part of this specification.

BACKGROUND OF THE INVENTION

1. Field of the Invention

The invention relates to a method for calibrating a listen duration and a listen interval and a control module thereof. More particularly, the invention relates to a method for calibrating a listen duration and a listen interval according to a result of calculating an average beacon-receiving time and a root-mean-square (RMS) beacon-receiving time and a control module for calibrating the listen duration and the listen interval.

2. Description of Related Art

According to the related art, a listen duration of a wireless device is preset as one traffic indicate map (TIM) time, and one TIM time is set as 100 milliseconds. Owing to said setting, the wireless device is not apt to miss beacons in wireless connection, whereas a wireless station consumes significant electric power due to the long listen duration.

Said issue of significant power consumption caused by the long listen duration is often resolved by means of a power saving mode of a wireless access point (AP). For instance, the wireless AP buffers frames to be transmitted to the wireless device; after the wireless device resumes from a monitoring mode, the buffered frames are transmitted to the wireless device. During association, the wireless AP further transmits beacons according to the TIM setting, and the wireless device receives the beacons according to a specified listen interval. However, practically speaking, the beacon transmission duration of the consumer wireless AP cannot completely comply with the TIM setting because of network noise interference, and a beacon drift issue occurring during the beacon transmission duration is to be resolved.

SUMMARY OF THE INVENTION

In an embodiment of the invention, a control module configured in a wireless device is provided. The control module is suitable for monitoring beacons that are transmitted by a wireless access point (AP) within a wireless transmission range and calibrating a listen duration and a listen interval according to the beacons. The control module includes a transceiver unit and a processing unit. The transceiver unit receives the beacons, and the processing unit is coupled to the transceiver unit. When a current listen duration and a current listen interval are determined to be calibrated, the processing unit calculates an average beacon-receiving time and a root-mean-square (RMS) beacon-receiving time according to a beacon-receiving interval that is obtained within a first specific time frame, and the processing unit sets the average beacon-receiving time as an optimal listen interval and sets the RMS beacon-receiving time as an optimal listen duration. The processing unit again monitors the beacons in X consecutive optimal listen durations according to the optimal listen interval and the optimal listen duration. If at least Y beacons are received, the processing unit determines that the calibration is successful. Here, X and Y are positive integers.

In an embodiment of the invention, a method for calibrating a listen duration and a listen interval is provided. The method is suitable for being applied in a wireless device and monitoring beacons transmitted by a wireless AP within a wireless transmission range, so as to calibrate the listen duration and the listen interval. The method includes: calculating an average beacon-receiving time and an RMS beacon-receiving time according to a beacon-receiving interval obtained within a first specific time frame when a current listen duration and a current listen interval are determined to be calibrated; setting the average beacon-receiving time as an optimal listen interval and setting the RMS beacon-receiving time as an optimal listen duration; monitoring the beacons again in X consecutive optimal listen durations according to the optimal listen interval and the optimal listen duration; if at least Y beacons are received, determining that the calibration is successful. Here, X and Y are positive integers.

In view of the above, the invention is directed to the method for calibrating the listen duration and the listen interval and the control module thereof. In real network environment, the listen duration and the listen interval of the wireless device are calibrated according to the result of calculating the average beacon-receiving time and the RMS beacon-receiving time. Thereby, the wireless device is able to accurately receive the beacons transmitted by the wireless AP without consuming an excessive amount of power.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
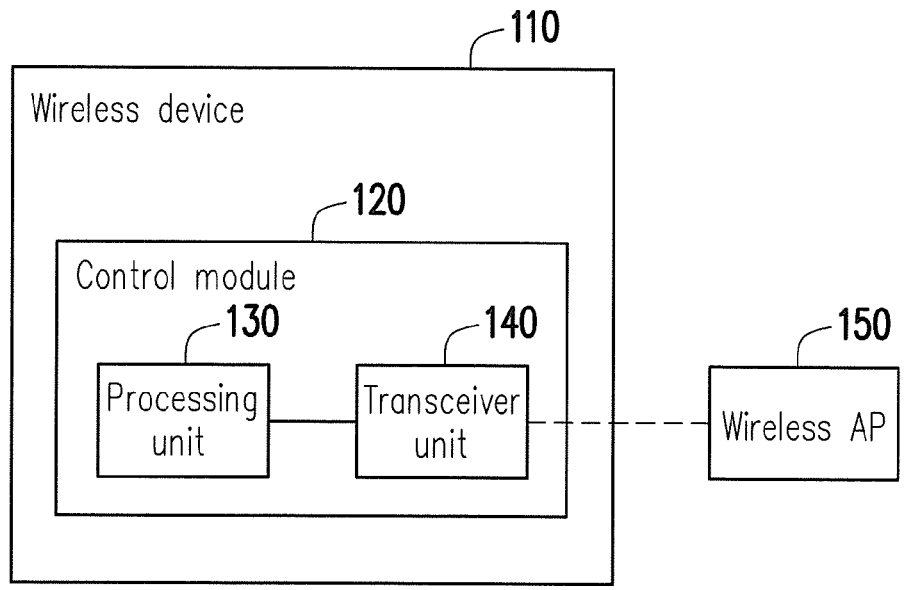
FIG. 1 is a functional block view of a control module according to an embodiment of the invention.

FIG. 1 is a functional block view of a control module 120 according to an embodiment of the invention. The control module 120 is configured in a wireless device 110. The control module 120 is suitable for monitoring beacons that are transmitted by a wireless access point (AP) 150 within a wireless transmission range and calibrating a listen duration LD and a listen interval LI according to the beacons. For instance, the control module 120 is a network interface card or a network chip that supports a wireless fidelity (WiFi) protocol, which should not be construed as a limitation to the invention. Alternatively, the control module 120 may be any other hardwire in a wireless device or may be implemented in form of software.

The control module 120 includes a processing unit 130 and a transceiver unit 140. In the present embodiment, the transceiver unit 140 wirelessly communicates with the wireless AP 150 through the WiFi protocol and receives the beacons transmitted by the wireless AP 150. For instance, the transceiver unit 140 receives signals transmitted by the wireless AP 150 through an antenna and transmits beacons (obtained by processing the signals) to the processing unit 130.

The processing unit 130 is coupled to the transceiver unit 140 and calibrates a listen duration and a listen interval according to a result of calculating an average beacon-receiving time and a root-mean-square (RMS) beacon-receiving time. According to an embodiment of the invention, the processing unit 130 is a module in a network interface card or in a network chip or a functional block implemented in form of hardware and/or software, and the processing unit 130 serves to process the relationship between the received beacons and time and thereby calculate the average beacon-receiving time and the RMS beacon-receiving time. Here, the hardware may be equipped with a computation function, such as a central processor, a chipset, a microprocessor, or a combination thereof; the software may refer to an operation system, a driver, etc.

As described above, the control module 120 is a network interface card or a network chip, for instance, while the invention is not limited thereto. That is, the control module 120 may also be a system that includes multiple hardware. For instance, the transceiver unit 140 may be a network interface card or a network chip that supports the WiFi protocol, and the processing unit 130 may be a functional block implemented in form of another hardware and/or software. As long as said effects are able to be achieved, any hardware, software, or a combination falls within the scope of the invention.

Figure 2:
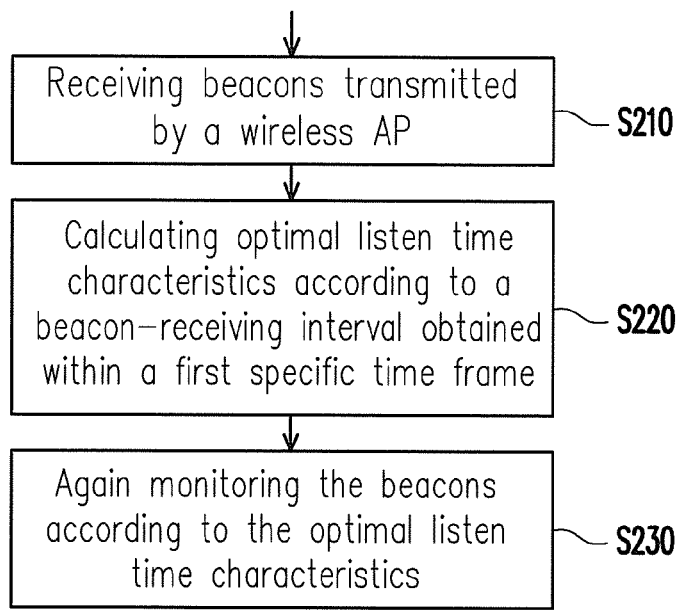
FIG. 2 is a flowchart illustrating a method for calibrating a listen duration and a listen interval according to an embodiment of the invention.

FIG. 2 is a flowchart illustrating a method for calibrating a listen duration and a listen interval according to an embodiment of the invention. With reference to FIG. 1 and FIG. 2, the transceiver unit 140 receives beacons transmitted by a wireless AP (step S210).

When current listen time characteristics are determined to be calibrated, the processing unit 130 calculates optimal listen time characteristics according to the beacon-receiving interval obtained within the first specific time frame (step S220). For instance, if the processing unit 130 determines that the beacon transmission duration has already changed, or that the beacon-receiving duration has already changed, the processing unit 130 determines that the current listen time characteristics are required to be calibrated. Here, the current listen time characteristics exemplarily refer to a current listen duration and/or a current listen interval. According to the beacon-receiving interval obtained within the first specific time frame, the processing unit 130 calculates the optimal listen time characteristics. Here, the first specific time frame may refer to a time frame during which the beacons are received ten times, and the optimal listen time characteristics may be an optimal listen duration and/or an optimal listen interval. The time characteristics of subsequent beacons may be estimated according to the beacons that are successfully received within the time frame of receiving the beacons ten times and according to the varying degrees of the beacon-receiving duration and the beacon-receiving interval, e.g., a one-millisecond increase in the beacon-receiving duration.

Figure 3:
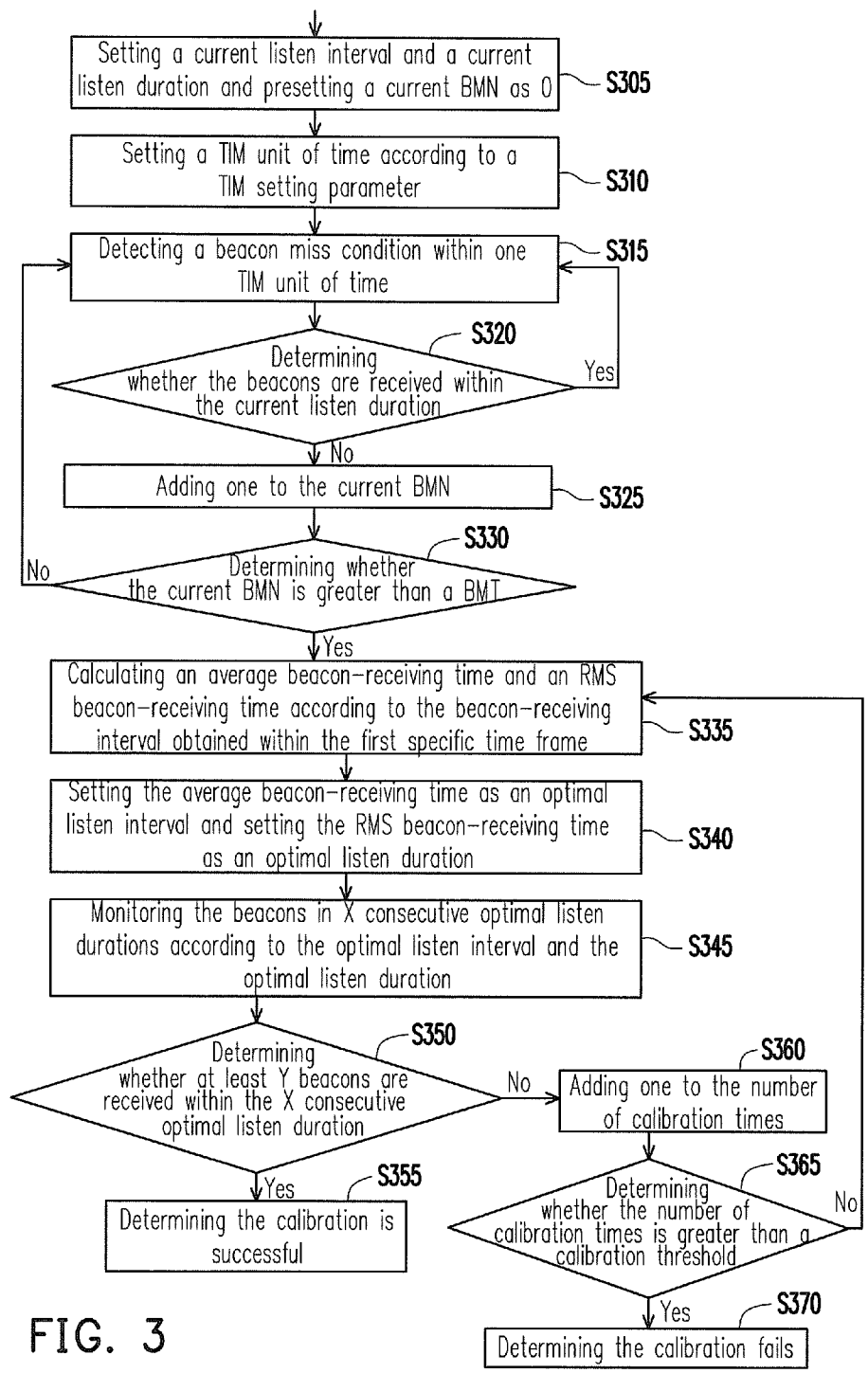
FIG. 3 is a flowchart illustrating a method for calibrating a listen duration and a listen interval according to another embodiment of the invention.

The processing unit 130 again monitors the beacons according to the optimal listen time characteristics (step S230). Here, the current listen time characteristics refer to the current listen duration and/or the current listen interval, and the optimal listen time characteristics refer to the optimal listen duration and/or the optimal listen interval. FIG. 3 is a flowchart illustrating a method for calibrating a listen duration and a listen interval according to another embodiment of the invention. The embodiment shown in FIG. 3 is derived from that depicted in FIG. 2. With reference to FIG. 1 and FIG. 3, a traffic indicate map (TIM) setting parameter is received from the wireless AP 150, and the current listen interval is set according to the TIM setting parameter. Besides, the processing unit 130 sets the current listen duration according to a communication parameter of the transceiver unit 140 in the wireless device 110 and presets a current beacon miss number (BMN) as 0 (step S305).

The processing unit 130 sets a TIM unit of time according to the TIM setting parameter in step S310. In the present embodiment, one TIM unit of time is 100 milliseconds, which is often represented as 1 TIM=100 ms. Within one TIM unit of time (i.e., within 100 ms), a beacon miss condition of the beacons transmitted from the wireless AP is detected (step S315). The processing unit 130 determines whether the beacons are received within the current listen duration (step S320). If the beacons are received and are not missed within the current listen duration, the processing unit 130 returns to step S215 and continuously detects the beacon miss condition within the next listen duration. In step S320, if the beacons are not received within the current listen duration (i.e., the determination result is negative in step S320), the processing unit 130 adds one to the current BMN (step S325). The processing unit 130 then determines whether the current BMN is greater than a beacon miss threshold (BMT) in step S330. If the current BMN is less than or equal to the BMT (i.e., the determination result is negative in step S330), the processing unit 130 returns to step S315 and continuously detects the beacon miss condition within the next listen duration.

If the determination result is affirmative in step S330, the current listen duration and the current listen interval are determined to be calibrated, and the average beacon-receiving time and the RMS beacon-receiving time are calculated according to the beacon-receiving interval obtained within the first specific time frame (step S335). Here, the first specific time frame is set to be ten TIM units of time (i.e., 10 TIM times) according to the TIM setting parameter transmitted by the wireless AP 150. Certainly, the first specific time frame may be determined in a different manner according to requirements of system manufacturers and should not be construed as a limitation to the invention.

According to the calculation result obtained in step S335, the processing unit 130 sets the average beacon-receiving time as the optimal listen interval and sets the RMS beacon-receiving time as the optimal listen duration (step S340), and the processing unit 130 again monitors the beacons according to the optimal listen interval and the optimal listen duration. In step S345, the processing unit 130 monitors the beacons in X consecutive optimal listen durations; in step S350, the processing unit 130 determines if the transceiver unit 140 receives at least Y beacons in the X consecutive optimal listen durations. If the determination result in step S350 is affirmative, the calibration is determined to be successful (step S355), and Y may be set as (X−2). For instance, the processing unit 130 monitors the beacons in ten consecutive optimal listen durations, and if the processing unit 130 determines that the transceiver unit 140 receives at least eight beacons, the calibration is determined to be successful. Undoubtedly, if a higher level of accuracy is required, Y may be set as 9. That is, the calibration is determined to be successful only when the processing unit 130 determines that the transceiver unit 140 receives at least nine beacons. Note that Y is not subject to those described herein.

On the contrary, if the determination result in step S350 is negative, it indicates that the transceiver unit 140 does not receive at least Y beacons. At this time, the processing unit 130 adds one to the number of calibration times (step S360).

In step S365, the processing unit 130 determines whether the number of calibration times is greater than a calibration threshold. Here, the calibration threshold may be determined according to system requirements or users' requirements. If the number of calibration times is equal to or less than the calibration threshold (i.e., the determination result in step S365 is negative), the processing unit 130 continuously calculates the average beacon-receiving time and the RMS beacon-receiving time within the subsequent first specific time frame according to the beacon-receiving interval obtained from the wireless AP 150 and calibrates the listen duration and the listen interval again. By contrast, if the number of calibration times is greater than the calibration threshold (i.e., the determination result in step S365 is affirmative), the calibration is determined to fail (step S370).

To sum up, the invention is directed to the method for calibrating the listen duration and the listen interval and the control module thereof. In real network environment, the listen duration and the listen interval of the wireless device are calibrated according to the result of calculating the average beacon-receiving time and the RMS beacon-receiving time. After that, the beacon-monitoring process is performed again according to the calibrated optimal listen duration and the calibrated optimal listen interval. Within the preset optimal listen durations, it is determined whether the expected number of beacons is received, and thereby whether the calibration is successful is determined. By applying the calibration method described herein, the wireless device is able to accurately and efficiently receive the beacons transmitted by the wireless AP without consuming an excessive amount of power.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A control module suitable for monitoring beacons transmitted by a wireless access point and calibrating listen time characteristics according to the beacons, the control module comprising:
    a transceiver unit receiving the beacons; and
    a processing unit coupled to the transceiver unit, wherein the processing unit calculates optimal listen time characteristics according to a beacon-receiving interval obtained within a first specific time frame and again monitors the beacons according to the optimal listen time characteristics,
    wherein when current listen time characteristics are determined to be calibrated, the processing unit further calculates an average beacon-receiving time and a root-mean-square beacon-receiving time according to the beacon-receiving interval obtained within the first specific time frame, and the processing unit further calculates the optimal listen time characteristics according to the average beacon-receiving time and the root-mean-square beacon-receiving time.

2. The control module as recited in claim 1, wherein the current listen time characteristics comprise a current listen duration and a current listen interval, and the optimal listen time characteristics comprise an optimal listen duration and an optimal listen interval.

3. The control module as recited in claim 2, wherein the processing unit further sets the average beacon-receiving time as the optimal listen interval and sets the root-mean-square beacon-receiving time as the optimal listen duration.

4. The control module as recited in claim 3, wherein the processing unit again monitors the beacons in X consecutive optimal listen durations according to the optimal listen interval and the optimal listen duration, the processing unit determines that the calibration is successful if the transceiver unit receives at least Y beacons, and X and Y are positive integers.

5. The control module as recited in claim 4, wherein when the processing unit monitors the beacons in the X consecutive optimal listen durations, if the transceiver unit does not receive the at least Y beacons, the processing unit adds one to the number of calibration times and determines whether the number of calibration times is greater than a calibration threshold, if yes, the processing unit determines that the calibration fails, and Y is set as (X−2).

6. The control module as recited in claim 5, wherein if the number of calibration times is equal to or less than the calibration threshold, the processing unit calculates the average beacon-receiving time and the root-mean-square beacon-receiving time within the first specific time frame according to the beacon-receiving interval obtained from the wireless access point, and the processing unit again calibrates the listen time characteristics.

7. The control module as recited in claim 2, further comprising:
    wherein when it is determined whether the current listen duration and the current listen interval have to be calibrated, the transceiver unit further receives a traffic indicate map setting parameter from the wireless access point, and the processing unit sets the current listen interval according to the traffic indicate map setting parameter and sets the current listen duration according to a communication parameter of the wireless device; and
    wherein after setting the current listen interval and the current listen duration, the processing unit presets a current beacon miss number as 0, sets a traffic indicate map unit of time according to the traffic indicate map setting parameter, and detects a beacon miss condition within one traffic indicate map unit of time, if the transceiver unit does not receive the beacons within the current listen duration, the processing unit adds one to the current beacon miss number and determines whether the current beacon miss number is greater than a beacon miss threshold, and the processing unit determines that the current listen duration and the current listen interval have to be calibrated if the current beacon miss number is greater than the beacon miss threshold.

8. The control module as recited in claim 7, wherein when the transceiver unit receives the beacons within the current listen duration, the processing unit continuously detects the beacon miss condition within a next listen duration.

9. The control module as recited in claim 7, wherein if the processing unit determines that the current beacon miss number is equal to or less than the beacon miss threshold, the processing unit continuously detects the beacon miss condition within a next listen duration.

10. A method for calibrating a listen duration and a listen interval, the method being suitable for monitoring beacons transmitted by a wireless access point and calibrating listen time characteristics according to the beacons, the method comprising:
    calculating optimal listen time characteristics according to a beacon-receiving interval obtained within a first specific time frame; and monitoring the beacons again according to the optimal listen time characteristics,
wherein the method further comprises:
when current listen time characteristics are determined to be calibrated, calculating an average beacon-receiving time and a root-mean-square beacon-receiving time according to the beacon-receiving interval obtained within the first specific time frame; and
calculating the optimal listen time characteristics according to the average beacon-receiving time and the root-mean-square beacon-receiving time.

11. The method as recited in claim 10, wherein the current listen time characteristics comprise a current listen duration and a current listen interval, and the optimal listen time characteristics comprise an optimal listen duration and an optimal listen interval.

12. The method as recited in claim 11, further comprising:
setting the average beacon-receiving time as the optimal listen interval; and
setting the root-mean-square beacon-receiving time as the optimal listen duration.

13. The method as recited in claim 12, further comprising:
monitoring the beacons again according to the optimal listen interval and the optimal listen duration; and
monitoring the beacons in X consecutive optimal listen durations and determining that the calibration is successful if at least Y beacons are received, wherein X and Y are positive integers.

14. The method as recited in claim 13, further comprising:
adding one to the number of calibration times if the beacons are monitored in the X consecutive optimal listen durations and if the at least Y beacons are not received; and
determining whether the number of calibration times is greater than a calibration threshold, and determining that the calibration fails if the number of calibration times is greater than the calibration threshold,
wherein Y is set as (X−2).

15. The method as recited in claim 14, further comprising:
if the number of calibration times is equal to or less than the calibration threshold, calculating the average beacon-receiving time and the root-mean-square beacon-receiving time within the first specific time frame according to the beacon-receiving interval obtained from the wireless access point, and calibrating the listen time characteristics again.

16. The method as recited in claim 11, the step of determining whether the current listen duration and the current listen interval have to be calibrated further comprising:
receiving a traffic indicate map setting parameter from the wireless access point and setting the current listen interval according to the traffic indicate map setting parameter;
setting the current listen duration according to a communication parameter of the wireless device;
after setting the current listen interval and the current listen duration, presetting a current beacon miss number as 0;
setting a traffic indicate map unit of time according to the traffic indicate map setting parameter;
detecting a beacon miss condition within one traffic indicate map unit of time;
adding one to the current beacon miss number if not receiving the beacons within the current listen duration; and
determining whether the current beacon miss number is greater than a beacon miss threshold, and if yes, determining that the current listen duration and the current listen interval have to be calibrated.

17. The method as recited in claim 16, further comprising:
continuously detecting the beacon miss condition within a next listen duration if receiving the beacons within the current listen duration.

18. The method as recited in claim 16, further comprising:
if determining that the current beacon miss number is equal to or less than the beacon miss threshold, continuously detecting the beacon miss condition within a next listen duration.

* * * * *